Feb. 11, 1941.     W. J. BELCHER     2,231,379
ROLLER CHAIN
Filed Sept. 28, 1939

INVENTOR.
Warren J. Belcher
BY
Gifford, Scull & Burgess
ATTORNEYS.

Patented Feb. 11, 1941

2,231,379

UNITED STATES PATENT OFFICE 2,231,379

ROLLER CHAIN

Warren J. Belcher, West Hartford, Conn., assignor to The Whitney Chain & Mfg. Company, Hartford, Conn., a corporation of Connecticut Application September 28, 1939, Serial No. 296,885

5 Claims. (Cl. 74—257)

This invention relates to a novel and improved form of roller chain and more particularly to the part thereof referred to as a "block." One of the principal objects of the invention is to provide a block which may be readily assembled with other parts of a chain which are of standard size and construction, while at the same time having certain advantages which will be more fully pointed out later. In the accompanying drawing, I have shown a selected embodiment of the invention and, referring thereto:

Figure 1:
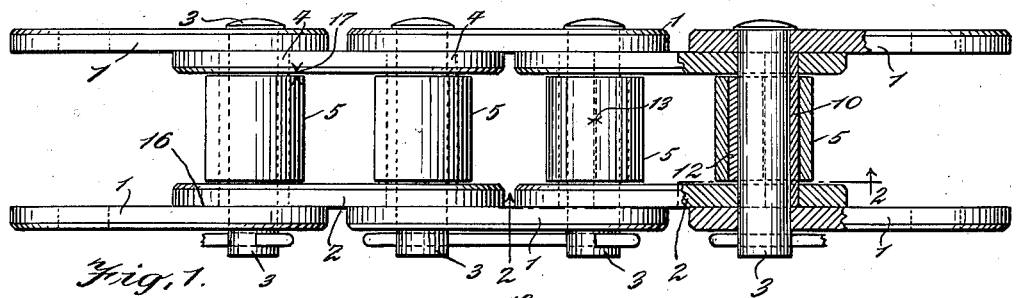
Fig. 1 is a plan view of a section of a chain showing a block constructed according to my invention, but assembled with other parts of the chain which are of standard and usual form and size, parts being broken away.

As known in the art, a roller chain normally consists of a succession of blocks connected together by what are sometimes referred to as outside or outer pin plates. Those plates are identified by the numeral 1 in the drawing, and at the left end of Fig. 1 I have shown a block of standard construction comprising two side plates 2 having holes adjacent their opposite ends through which may pass pivot pins 3 which are also received in aligned holes in the plates 1. Usually the plates 2 are connected together by bushings 4 which are rigidly secured to both side plates, usually by being tightly held in the aligned pivot pin holes of the two side plates. Rotatably mounted on the two bushings of each block are rollers shown at 5.

Figure 4:
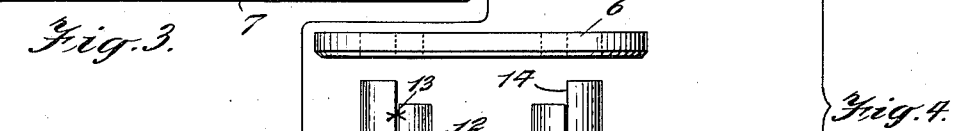
Fig. 4 is an exploded view of the block appearing in Fig. 3 and showing the relation of those parts to other parts of a standard chain.
Figure 4:
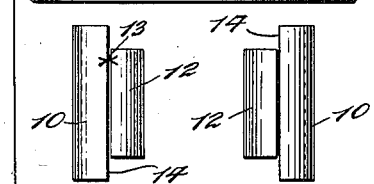

In assembling a chain, two adjacent blocks are fastened together by means of two of the pin plates 1, it being customary to rigidly secure the two pivot pins in one of the pin plates, as shown in Fig. 4, and then to insert the two pins through bushings in adjacent blocks to pivotally connect the blocks together. Then another pin plate is placed over the free ends of the pins and held in place by any suitable device, which may be a locking pin. On the other hand, the free ends of the pins may be upset or riveted to engage the outside or pin plates 1. For the sake of illustration, I have shown adjacent pins held in place by means of a locking pin, which is more fully described and claimed in my copending application, Ser. No. 303,010, filed Nov. 6, 1939.

Figure 5:
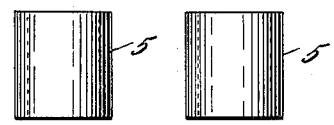
Fig. 5 is a face view of the plate appearing in Fig. 2 but without any other parts assembled therewith.
Figure 5:
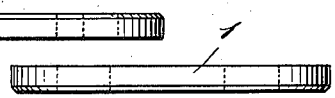
Figure 5:
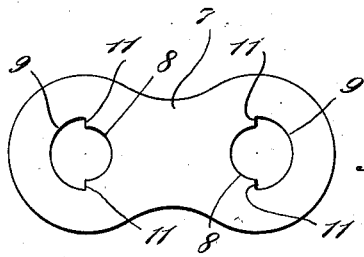

At the right-hand end of Fig. 1 I have shown a block constructed according to my invention, and the details of that block are more fully illustrated in the other figures of the drawing. The block consists of two side plates 6 and 7, which are of standard size and dimensions except as specifically noted. Instead of providing each plate with holes of a size to receive a tubular bushing as is standard practice, however, I provide two holes of the configuration best shown in Fig. 5. There it will be seen that the wall of each hole is formed in two parts 8 and 9, on arcs of concentric circles. The smaller radius, for the part 8, is slightly greater than the radius of one of the pivot pins 3, whereas the radius of the part 9 is materially greater, the difference being substantially equal to the thickness of a section of a liner indicated at 10. For the sake of illustration, I have shown this liner section as being substantially semi-circular in cross section and as having its edges engaging the shoulders 11 which join the parts 8 and 9 of the hole wall. Preferably the liner section 10 is driven into the hole in the plate 6 so as to be rigidly secured thereto and has a close sliding fit in the corresponding part of the hole in the plate 7 so that the plate 7 may be removed without great difficulty to permit replacement of the various parts between the two side plates 6 and 7.

Cooperating with the liner section 10 is a shorter liner section 12, which is of such a length that it will loosely fit between the plates 6 and 7. That is to say, its length is somewhat shorter than the clear space between these two plates. The two sections 10 and 12 together form substantially a complete cylinder, although their edges are normally spaced apart a short distance, as indicated at 13.

Figure 2:
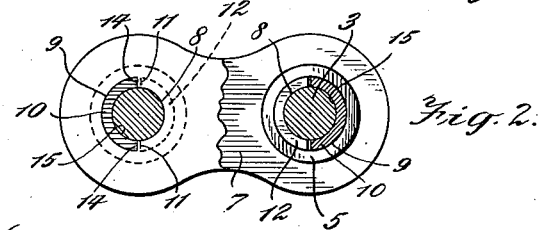
Fig. 2 is a view on the line 2—2 of Fig. 1.
Figure 3:
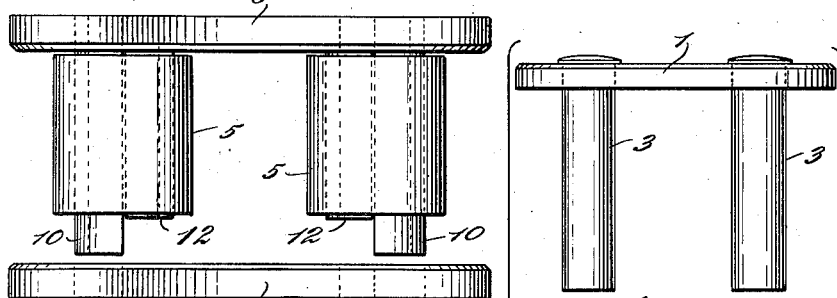
Fig. 3 is a plan view of a block having one of the side plates removed therefrom.

In assembling the parts, the sections 10 are driven into the holes in one of the side plates, here shown as the plate 6, and then their edges 14 will engage the shoulders 11, as shown in Fig. 2. The outer surface of the liner 10 is of substantially the same radius as the radius of the wall part 9 and therefore will fit snugly against that part of the wall. At the same time, the inner surface 15 of the section 10 has substantially the same radius as the part 8, so that when the liner is driven into place, the part 8 of the wall and the surface 15 of the section 10 will form a substantially continuous cylindrical surface to engage the pivot pin, the outer surface of the pivot pin of course being cylindrical, as usual, and being of a slightly smaller radius than the radius of the part 8. Then one of the sections 12 is assembled with the section 10 and a roller 5 is slipped over the two sections, after which the plate 7 is ready to be slipped over the section 10.

Most of the operations described above are those for assembling the parts at one end of a side plate of a block, and of course the same operations are also performed at the other end, after which the plate 7 may be slid into place over the liner sections 10. The fit between the sections 10 and the plate 7 may be a driven fit if desired. In any case, after the parts are assembled as described above, then the block is ready for assembly in a chain, in which case of course pivot pins 3 will pass through the aligned holes in the plates 6 and 7 and through the sectional liners, and the locking pins or other fastening devices are applied.

There are several advantages derived from the above construction, some of which will be briefly noted.

The standard type of bushing is that shown at 4 in Fig. 1, and this bushing is tubular in form and fastened in holes in both of the plates 2. That being the case, it will be seen that it is impossible to lubricate the pivot pins except along the plane of contact between the outer surface of a plate 2 and the inner surface of a plate 1, namely, at the point designated 16 in Fig. 1. The plates 1 and 2 are usually in close contact with each other and by the time that lubricant works down between these surfaces and into the bushing surrounding one of the pins, the amount of lubrication furnished is questionable and usually unsatisfactory. However, the rollers 5 usually have a length which is materially less than the clear space between the plates 2, as plainly shown in Fig. 1 at 17. Therefore, when chain constructed according to my invention is used, lubricant may be put into the space 17 and, since the section 12 does not extend into the holes in the plates 6 and 7, the lubricant can at once work onto the pivot pin. Moreover, the lubricant can work along one of the spaces 13, it being understood of course that there are two of these spaces in the illustrated embodiment, at approximately 180° apart.

Accordingly, by my invention I have provided an arrangement whereby chain may be efficiently lubricated.

Another advantage of the invention is the anchoring of the liner section 10 so that it will not turn in the side plates. With the standard form of tubular bushing shown at the left end of Fig. 1, it often happens that the bushing will work loose and then this causes the holes in the plates of the block to become larger, consequently decreasing the bearing surface between the bushing and the walls of the holes in the plates and permitting the tubular bushings to collapse and get out of shape. All of this trouble is avoided by the arcuate shaped liner, the ends 14 of which rest against the shoulders 11 which form abutments for the liner section. Moreover it is more practical to make the liner section out of hardened material than is the case when using tubular bushings.

From the above description it will be seen that I have provided a roller chain block which has important advantages, some of which have been mentioned above and others of which will be apparent to those skilled in the art, all without sacrificing the requirement that the parts shall be interchangeable with other chain parts of standard construction, such as illustrated at the left end of Fig. 1. While I have shown the invention as embodied in a certain form, nevertheless it is to be understood that various changes in details may be made without departing from the invention as defined by the appended claims.

I claim:

1. In a roller chain, a block comprising two side plates with aligned pivot pin holes therein, each side plate having two of said holes adjacent opposite ends of the plate, one of said holes in opposite plates having its wall in two concentric parts of different radii, the part of greater radius being disposed on the side of the hole nearest the adjacent end of the plate and joined to the other part by shoulders, a liner section fitting within the holes of opposite plates and engaging the parts of the hole walls of greater radius, the inner surface of said section having substantially the same radius as the smaller radius part of said wall, said smaller radius being slightly greater than that of a pivot pin, and a roller loosely supported on said section.

2. In a roller chain, a block comprising two side plates with aligned pivot pin holes therein, each side plate having two of said holes adjacent opposite ends of the plate, one of said holes in opposite plates having its wall in two concentric parts of different radii, the part of greater radius being disposed on the side of the hole nearest the adjacent end of the plate and joined to the other part by shoulders, a liner section fitting within the holes of opposite plates and engaging the parts of the hole walls of greater radius and having its ends engaging said shoulders, the inner surface of said section having substantially the same radius as the smaller radius part of said wall, said smaller radius being slightly greater than that of a pivot pin, and a roller loosely supported on said section.

3. In a roller chain, a block comprising two side plates with aligned pivot pin holes therein, each side plate having two of said holes adjacent opposite ends of the plate, one of said holes in opposite plates having its wall in two concentric parts of different radii, the part of greater radius being disposed on the side of the hole nearest the adjacent end of the plate and joined to the other part by shoulders, a liner section fitting within the holes of opposite plates and engaging the parts of the hole walls of greater radius, the inner surface of said section having substantially the same radius as the smaller radius part of said wall, said smaller radius being slightly greater than that of a pivot pin and a second liner section having the same inside radius as the first-named section, but of a length slightly less than the clear space between the side plates of the block, and a roller loosely supported on said section.

4. In a roller chain, a block comprising two side plates with aligned pivot pin holes therein, each side plate having two of said holes adjacent opposite ends of the plate, one of said holes in opposite plates having its wall in two concentric parts of different radii, the part of greater radius being disposed on the side of the hole nearest the adjacent end of the plate and joined to the other part by shoulders, a liner section fitting within the holes of opposite plates and engaging the parts of the hole walls of greater radius, the inner surface of said section having substantially the same radius as the smaller radius part of said wall, said smaller radius being slightly greater than that of a pivot pin and a second liner section having the same inside radius as the first-named section, but of a length slightly less than the clear space between the side plates of the block, and a roller loosely supported on said section, adjacent edges of said sections normally being spaced apart.

5. In a roller chain, a block comprising two side plates with aligned pivot pin holes therein, a pivot pin extending through two holes in opposite plates, a liner surrounding said pin and formed in sections having adjacent edges normally spaced apart, and a roller surrounding said liner, one of said sections being secured to one of said side plates and another of said sections being loosely disposed therebetween.

WARREN J. BELCHER.